United States Patent
Sevestrian

(10) Patent No.: US 12,464,468 B2
(45) Date of Patent: Nov. 4, 2025

(54) VISUALIZATION METHOD OF VISUALIZING DOWNLINK SIGNAL POWER LEVELS AND OFFSETS IN A WIRELESS COMMUNICATION CELL, TESTING METHOD AND MEASUREMENT SYSTEM

(71) Applicant: Rohde & Schwarz GmbH & Co. KG, Munich (DE)

(72) Inventor: Codrin-Gabriel Sevestrian, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 538 days.

(21) Appl. No.: 17/935,008

(22) Filed: Sep. 23, 2022

(65) Prior Publication Data

US 2024/0107459 A1   Mar. 28, 2024

(51) Int. Cl.
| | |
|---|---|
| *H04W 52/14* | (2009.01) |
| *H04B 17/391* | (2015.01) |
| *H04W 72/044* | (2023.01) |
| *H04W 72/23* | (2023.01) |

(52) U.S. Cl.
CPC ........ *H04W 52/143* (2013.01); *H04B 17/391* (2015.01); *H04W 72/0473* (2013.01); *H04W 72/23* (2023.01)

(58) Field of Classification Search
CPC ..... H04W 16/18; H04W 24/00; H04W 24/02; H04W 24/08; H04W 52/143; H04W 72/0473; H04W 72/23; H04B 17/391
See application file for complete search history.

(56) References Cited

U.S. PATENT DOCUMENTS

| | | | |
|---|---|---|---|
| 2021/0067988 A1* | 3/2021 | Daneshvar | H04W 16/14 |
| 2021/0377788 A1* | 12/2021 | Yoon | H04W 28/0284 |
| 2022/0109528 A1 | 4/2022 | Babaei | |
| 2023/0180019 A1* | 6/2023 | Martin | H04W 24/02 455/446 |

* cited by examiner

*Primary Examiner* — Nguyen T Vo
(74) *Attorney, Agent, or Firm* — CHRISTENSEN O'CONNOR JOHNSON KINDNESS PLLC

(57) ABSTRACT

A visualization method of visualizing downlink signal power levels and offsets in a wireless communication cell is described. The visualization method includes the following steps: processing a set of downlink communication parameters, wherein the set of downlink communication parameters includes downlink signal parameters of the wireless communication cell, wherein the downlink signal parameters relate to the wireless communication cell as a whole or to portions of the wireless communication cell; and generating visualization data based on the set of downlink communication parameters, wherein the visualization data includes information on a status of the wireless communication cell, and wherein the status relates to the validity of downlink signal power levels and offsets in the wireless communication cell.

20 Claims, 8 Drawing Sheets

VISUALIZATION METHOD OF VISUALIZING DOWNLINK SIGNAL POWER LEVELS AND OFFSETS IN A WIRELESS COMMUNICATION CELL, TESTING METHOD AND MEASUREMENT SYSTEM

FIELD OF THE DISCLOSURE

Embodiments of the present disclosure generally relate to a visualization method of visualizing downlink signal power levels and offsets in a wireless communication cell. Embodiments of the present disclosure further relate to a testing method of testing a wireless communication cell, and to a measurement system.

BACKGROUND

Modern wireless communication standards support large bandwidths ranging from below 1 GHz to above 50 GHz. A prominent example is 5G New Radio that supports particularly large bandwidths.

Together with the flexible specifications of 5G New Radio, for example the flexible subcarrier spacing and the flexible bandwidth that can be used by individual user equipment devices, this allows fulfilling different requirements of different use cases.

The downside of this great flexibility is that setting up such communication systems is considerably more complex than setting up a communication with previous mobile communication standards, as there is a plurality of communication parameters that have to be set, wherein these communication parameters are partially interdependent of each other.

Particularly, setting downlink parameters of the communication system in a consistent manner requires a considerable amount of expertise from a user.

Thus, there is a need for devices and methods that simplify setting up downlink parameters of a communication system and to verify the respective settings.

SUMMARY

Embodiments of the present disclosure provide a visualization method of visualizing downlink signal power levels and offsets in a wireless communication cell. In an embodiment, the visualization method comprises the following steps:

Processing, by a processing circuit, a set of downlink communication parameters, wherein the set of downlink communication parameters comprises downlink signal parameters of the wireless communication cell, wherein the downlink signal parameters relate to the wireless communication cell as a whole or to portions of the wireless communication cell; and Generating, by a visualization circuit, visualization data based on the set of downlink communication parameters, wherein the visualization data comprises information on a status of the wireless communication cell, and wherein the status relates to the validity of downlink signal power levels and offsets in the wireless communication cell.

Therein and in the following, the term "processing a set of downlink communication parameters" is understood to comprise one or more of the following examples or others.

A user may input the downlink communication parameters, for example the complete set of downlink communication parameter. For instance, the user may input the downlink communication parameters via a suitable user interface in order to set up the wireless communication cell. Then, the processing circuit processes the downlink communication parameters inputted.

Alternatively or additionally, the downlink communication parameters may be loaded, e.g. by the processing circuit, from a database, for example wherein the complete set of downlink communication parameter may be loaded from a database. Accordingly, at least some of the downlink communication parameters may be set to a default value saved in the database.

Alternatively or additionally, the set of downlink communication parameters may be complemented with at least one missing downlink communication parameter by the processing circuit. In other words, the user may input one or several downlink communication parameters, and the processing circuit may automatically determine further downlink communication parameters that are dependent on the downlink communication parameters already entered by the user. Thus, the user does not have to input all downlink communication parameters, but only the independent downlink communication parameters that are necessary, e.g. in order to fully define the downlink channel(s) of the wireless communication cell.

At least one downlink communication parameter of the set of downlink communication parameters is corrected automatically by the processing circuit. In other words, the processing circuit may analyze the set of downlink communication parameters inputted by the user and may compare the set of downlink communication parameters with a database of valid specifications in order to check whether the individual downlink communication parameters are compatible with each other. If one or several of the downlink communication parameters are not compatible with each other, the processing circuit may automatically correct one or several of the downlink communication parameters.

The processing circuit may forward information related to the downlink communication parameters, namely the set of downlink communication parameters, to the visualization circuit that processes the information, thereby generating the visualization data. Hence, the visualization data is generated based on the set of downlink communication parameters.

The visualization method according to embodiments of the present disclosure is based on the idea to support a user in setting up a valid configuration of the wireless communication cell by providing the visualization data to the user. In other words, the status of the wireless communication cell is displayed to the user in an illustrative way.

Thus, the user can easily recognize whether the current set of downlink communication parameters leads to a valid configuration of the wireless communication cell or whether corrections to the set of downlink communication parameters are necessary. In other words, the user obtains an intuitive understanding of the relationships of the downlink communication parameters among each other.

For example, visual indicators may be displayed that indicate whether the downlink signal power levels and/or the downlink signal power offsets resulting from the generated set of downlink communication parameters are compatible with each other or not, e.g. by using a color-coded scheme, warning signs, and/or text messages.

Thus, visual feedback is provided to the user about the validity of the downlink signal power levels and/or the downlink signal power offsets resulting from the generated set of downlink communication parameters for the wireless communication cell as a whole or for portions of the wireless communication cell.

Further, the user may be assisted in configuring the wireless communication cell by complementing the set of downlink parameters and/or correcting errors as described above. In some embodiments, the user obtains a direct visual feedback due to the visualization data generated. Accordingly, the expertise and time necessary to configure the wireless communication cell are significantly reduced.

In general, the processing circuit and/or the visualization circuit may be part of a computer system. For example, the processing circuit and/or the visualization circuit may be established as software (e.g., executable instructions, etc.) running on a measurement instrument, a personal computer, a laptop, a smart phone, a tablet, or on any other type of smart device.

Alternatively, the processing circuit and/or the visualization circuit may be established as a combination of hardware and software, wherein the processing circuit and/or the visualization circuit may be established as or integrated into a measurement instrument, a computer, a laptop, a smartphone, a tablet, or into any other type of smart device.

Generally, the visualization data may be used by a graphical editor. In some embodiments, the visualization circuit may generate the graphical editor.

According to an aspect of the present disclosure, the visualization data comprises, for example, at least one absolute reference point and/or at least one relative reference point. Thus, the downlink signal power levels and/or the downlink signal power offsets resulting from the generated set of downlink communication parameters are visualized relative to the absolute reference point and/or to the at least one relative reference point.

In an embodiment of the present disclosure, the visualization data comprises a maximum energy per resource element (EPREmax), a signal synchronization block (SSB), and/or a channel state indicator reference signal (CSI-RS). Thus, additional information regarding the EPREmax, the SSB, and/or the CSI-RS is provided to the user, such that setting up the wireless communication cell is facilitated.

According to another aspect of the present disclosure, the visualization data comprises, for example, a secondary synchronization signal (SSS) EPRE as a reference signal. Thus, the downlink signal power levels and/or the downlink signal power offsets resulting from the generated set of downlink communication parameters are visualized relative to the SSS EPRE.

In some embodiments, the visualization data may comprise a primary synchronization signal (PSS), a physical downlink control channel (PDCCH), a physical downlink shared channel (PDSCH), and/or a non-zero-power (NZP) CSI-RS in relation to the SSS EPRE. Thus, additional information regarding the PSS, the PDCCH, the PDSCH, and/or the NZP CSI-RS is provided to the user, for example information on the respective relation to the SSS EPRE, such that setting up the wireless communication cell is facilitated.

In a further embodiment of the present disclosure, the visualization data comprises a PDSCH in relation to a NZP CSI-RS. Accordingly, additional information on a relation between the PDSCH and the NZP CSI-RS is provided to the user, such that setting up the wireless communication cell is facilitated.

In some embodiments, the set of downlink communication parameters is provided with default values of the downlink signal parameters. In other words, the default values of the downlink signal parameters may be loaded from a database and the resulting downlink signal power levels and offsets may be visualized, wherein the default values of the downlink signal parameters correspond to a valid configuration of the wireless communication cell. Starting from this valid configuration, the user may adapt the downlink signal parameters in order to configure the wireless communication cell, thereby obtaining an adapted set of communication parameters. Then, visualization data associated with the adapted set of communication parameters may be generated, such that visual feedback on the validity of the adapted downlink signal power levels and/or the adapted downlink signal power offsets resulting from the adapted set of downlink communication parameters is provided to the user.

A user interface may be provided, wherein the set of downlink communication parameters is adaptable via the user interface. For example, the user interface may comprise a graphical editor, wherein the user may input and/or adapt the downlink signal parameters via the graphical editor.

Alternatively or additionally, the user interface may comprise a dropdown menu that allows a user to choose the downlink communication parameters from a list, for example wherein the list comprises only valid choices for the downlink communication parameters.

Alternatively or additionally, the user interface may comprise numerical text fields, wherein the user may enter the downlink communication parameters into the numerical text fields. If the user enters invalid downlink communication parameters, a warning message may be displayed automatically, such that the user is warned that the entered downlink communication parameters do not lead to a valid configuration of the wireless communication cell.

In some embodiments, the processing circuit may check the downlink communication parameters in order to verify whether the values of the downlink communication parameters, e.g. the power levels and/or offsets, currently relate to a valid configuration of the wireless communication cell or not.

An aspect of the present disclosure provides that at least one of the remaining downlink signal parameters is, for example, automatically adapted if at least one downlink signal parameter is adapted via the user interface, thereby obtaining an adapted set of downlink communication parameters. In other words, interdependencies of the downlink communication parameters are automatically taken into account. If the user adapts at least one of the downlink communication parameters, the downlink communication parameters that are dependent on the at least one adapted downlink communication parameters are automatically adapted, thereby assisting the user in configuring the wireless communication cell. Alternatively, guidance and/or hints are visualized in order to assist the user in configuring the wireless communication cell.

In an embodiment of the present disclosure, the at least one of the remaining downlink signal parameters is automatically adapted such that a resulting configuration of the wireless communication cell is viable. Thus, if the user adapts at least one of the downlink communication parameters, the downlink communication parameters that are dependent on the at least one adapted downlink communication parameters are automatically adapted so as to obtain a valid configuration of the wireless communication cell.

In some embodiments, a hierarchy is provided between the downlink signal parameters, wherein downlink signal parameters belonging to a lower level of the hierarchy are automatically adapted. The hierarchy may reflect interdependencies between the downlink communication parameters, such that dependent downlink communication parameters are on a lower hierarchy level than the respective downlink communication parameters they depend on. Accordingly, if the user adapts a certain downlink communication parameter, the downlink communication parameters that are dependent on the adapted downlink communication parameter are automatically adapted, for example such that a valid configuration of the wireless communication cell is obtained.

In a further embodiment of the present disclosure, adapted visualization data is generated based on the adapted set of downlink communication parameters. In other words, the changes to the downlink communication parameters and/or the resulting changes to the signal power levels and offsets are visualized, such that the user can immediately see the consequences of certain adaptations of the downlink communication parameters, for example whether the resulting configuration of the wireless communication cell is valid.

According to another aspect of the present disclosure, individual portions of the wireless communication cell are, for example, selectable via the user interface. For example, the user may select individual portions of the wireless communication cell, e.g. individual devices, and may set up the communication parameters of the selected portions individually. Alternatively or additionally, the user may select individual channels or individual beams of the wireless communication cell, and may adapt the individual channels and/or beams individually. Thus, a maximum amount of customization is provided.

The visualization data may comprise a PDSCH as a global offset to a predefined reference, wherein an actual PDSCH is displayed in the context of a selected portion of the wireless communication cell. Thus, additional information regarding the PDSCH in relation to the predefined reference, for example in the context of the selected portion of the wireless communication cell, is provided to the user, such that setting up the wireless communication cell is facilitated.

In a further embodiment of the present disclosure, the predefined reference is an SSB or a NZP CSI-RS beam. Thus, additional information regarding the PDSCH in relation to the SSB or to the NZP CSI-RS beam is provided to the user, such that setting up the wireless communication cell is facilitated.

Another aspect of the present disclosure provides that the wireless communication cell is, for example, a 5G New Radio cell. Thus, the visualization method described above supports a user in setting up, i.e. in configuring portions of the 5G New Radio cell or the complete 5G New Radio cell. As 5G New Radio supports a, for example, large bandwidth and allows for a large variety of customizations, setting up 5G New Radio cells usually is for example complicated and requires a lot of expertise from the user. With the visualization method according to the present disclosure, the expertise required from the user for setting up the 5G New Radio cell is significantly reduced, and the process of setting up the 5G New Radio cell is sped up considerably.

Accordingly, a graphical solution, namely the graphical editor, may be generated, for example based on the visualization data, which is used to set downlink signal power levels and offsets. This ensures a simple and user-friendly configuration of the wireless communication cell, for example together with a consistency check. In addition, a visual feedback of the downlink communication parameters (set) is provided, for example the downlink signal power levels and offsets.

In addition, the graphical solution, namely the graphical editor, can also be used for guiding the user within valid boundaries when setting the downlink communication parameters. Alternatively or additionally, automatic adaptation of at least one downlink communication parameter is done. Accordingly, a direct feedback is provided.

The valid boundaries may relate to a signal-specific EPRE that exceeds EPREmax, a relation of PSS to SSS offset outside of a valid range, e.g. 0 to 3 dB, a relation of CSI-RS to SSS offset outside of a valid range, e.g. −3 to 6 dB, and/or a relation of PDSCH to CSI-RS offset outside of a valid range, e.g. −8 to 15 dB.

The graphical editor may further ensure that levels and/or offsets can be set via the graphical editor, e.g. by drag and drop.

Embodiments of the present disclosure further provide a testing method of testing a wireless communication cell. In an embodiment, the testing method comprises the following steps:

Processing, by a processing circuit, a set of downlink communication parameters, wherein the set of downlink communication parameters comprises downlink signal parameters of the wireless communication cell, wherein the downlink signal parameters relate to the wireless communication cell as a whole or to portions of the wireless communication cell; and Generating, by a visualization circuit, visualization data based on the set of downlink communication parameters, wherein the visualization data comprises information on a status of the wireless communication cell, wherein the status relates to the validity of downlink signal power levels and offsets in the wireless communication cell.

A user interface is provided, wherein the set of downlink communication parameters is adaptable via the user interface. The set of downlink communication parameters is forwarded to a mobile radio testing device.

Accordingly, the user may set up the wireless communication cell supported by the visualization method described above, thereby obtaining a valid configuration of the wireless communication cell.

Afterwards, the wireless communication cell is tested by the mobile radio testing device based on the obtained configuration, such that the obtained configuration of the wireless communication cell can be verified.

Regarding the further advantages and properties of the testing method, reference is made to the explanations given above with respect to the visualization method, which also hold for the testing method and vice versa.

According to an aspect of the present disclosure, a beam selection test and/or a throughput test is, for example, performed by the mobile radio testing device. Thus, different aspects of the performance of the wireless communication cell can be assessed.

It is to be understood that any other suitable test may be performed on the wireless communication cell, e.g. according to a test protocol that is provided in the communication standard used by the wireless communication cell.

According to another aspect of the present disclosure, at least one of the remaining downlink signal parameters is, for example, automatically adapted if at least one downlink signal parameter is adapted via the user interface, thereby obtaining an adapted set of downlink communication parameters, wherein the adapted set of downlink communication parameters is forwarded to the mobile radio testing device. Thus, the user can adapt the downlink communication parameters (as described above in more detail), and the wireless communication cell can immediately be tested based on the adapted communication parameters. Thus, the time necessary for testing different configurations of the wireless communication cell is reduced.

Embodiments of the present disclosure further provide a measurement instrument. The measurement instrument is configured to perform the visualization method described above.

In some embodiments, the measurement instrument is configured to perform the testing method described above.

Regarding the further advantages and properties of the measurement instrument, reference is made to the explanations given above with respect to the visualization method and with respect to the testing method, which also hold for the measurement instrument and vice versa.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
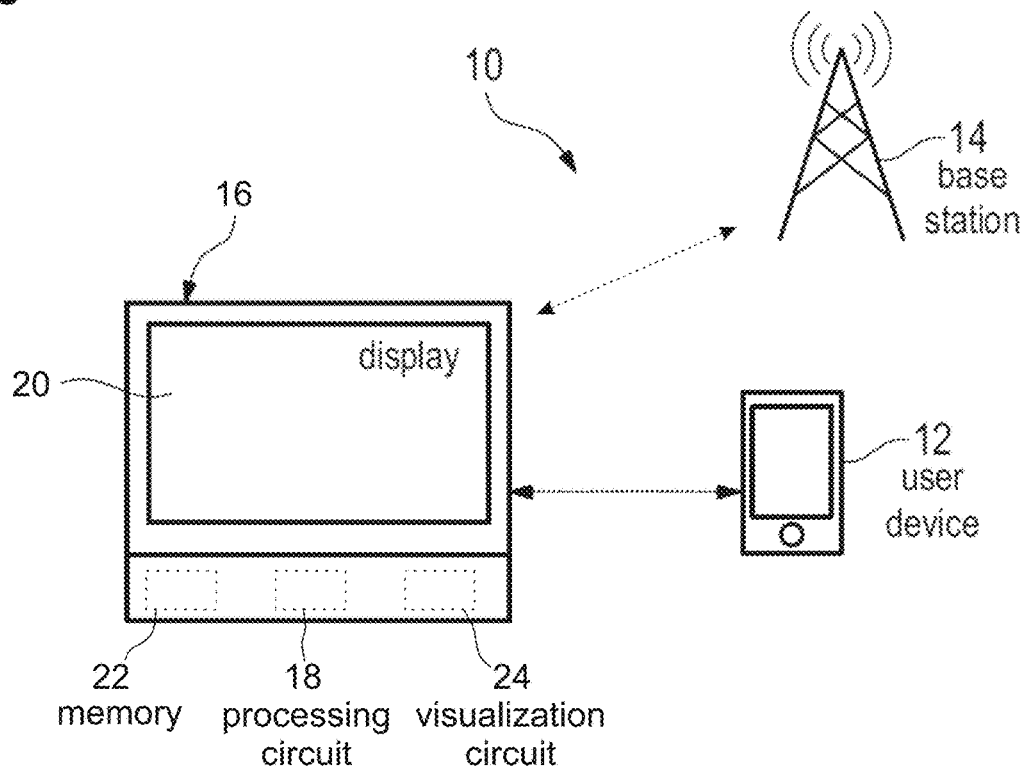
FIG. 1 schematically shows a wireless communication cell with a measurement system according to an embodiment of the present disclosure.

FIG. 1 schematically shows a wireless communication cell 10 comprising a user device 12 and a base station 14. In some embodiments, the wireless communication cell 10 may comprise further user devices 12 and/or further base stations 14.

Without restriction of generality, the wireless communication cell 10 is assumed to be a 5G New Radio cell in the following, i.e. the user device 12 is a 5G New Radio user device, and the base station 14 is a 5G New Radio base station.

Generally, the 5G New Radio base station 14 may be established by a mobile radio testing device, e.g. a base station emulator/simulator instead of a real base station.

Accordingly, the 5G New Radio cell 10 corresponds to a testing environment for testing the 5G New Radio user device(s) 12 under certain conditions, for example simulated real world environments, in order to test its performance and/or characteristics with regard to at least one testing scenario applied.

The user device 12 is established as any kind of electronic device being configured to communicate via 5G New Radio. For example, the user device 12 may be established as a mobile phone, as a tablet or as any other type of 5G-compatible (smart) device.

The base station 14 is configured to communicate with the user device 12 via 5G New Radio. Accordingly, the base station 14 is configured to transmit data to the user device 12 via a downlink channel of the user device 12 and to receive data from the user device 12 via an uplink channel of the user device 12.

Further, a measurement instrument 16 is provided. In the example embodiment of FIG. 1, the measurement instrument 16 is established as a laptop comprising a processing circuit 18, a display 20, a memory 22, and a visualization circuit 24. However, it is to be understood that the measurement instrument 16 may be established as or integrated into any other type of computing device, for example a dedicated testing instrument, a personal computer, a smart phone, a tablet, or any other type of smart device.

The measurement instrument 16 is connected to the user device 12 in a signal transmitting manner. Alternatively or additionally, the measurement instrument 16 may also be connected to the base station 14.

Therein and in the following, the term "connected in a signal transmitting manner" is understood to denote a cable-based or wireless connection that is configured to transmit signals between the respective devices or components.

Figure 2:
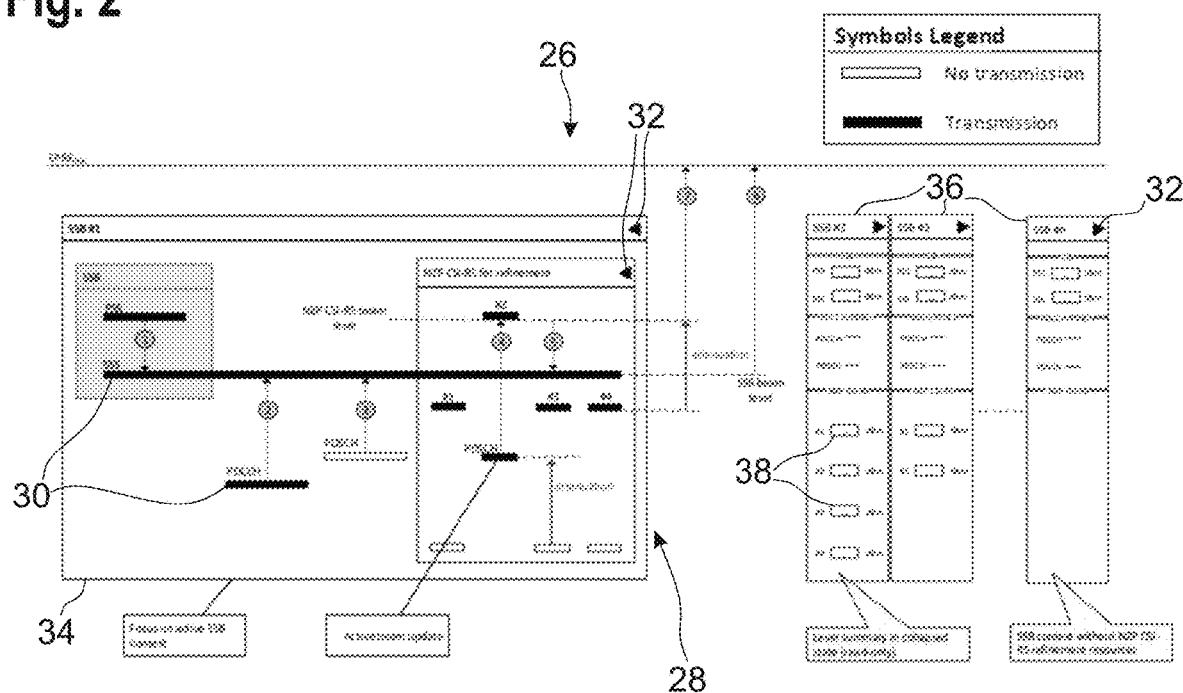
FIG. 2 schematically shows an example of a user interface of the measurement system of FIG. 1.

As is shown in FIG. 2, the measurement instrument 16 comprises a graphical user interface 26. The graphical user interface 26 may be displayed on the display 20 of the measurement instrument 16. Generally speaking, the graphical user interface 26 is configured to receive user input being associated with 5G downlink communication parameters, and to display information regarding the 5G downlink communication parameters to the user.

The individual downlink communication parameters and the functionality of the graphical user interface 26 will be described in more detail below.

In general, the measurement instrument 16 is configured to set downlink communication parameters of the wireless communication cell 10 based on user input. In other words, a user may configure (downlink) communication properties of the wireless communication cell 10 by the graphical user interface 26 of the measurement instrument 16.

The measurement instrument 16 is configured to assist the user in setting up the wireless communication cell 10 in a plurality of ways.

Figure 3:
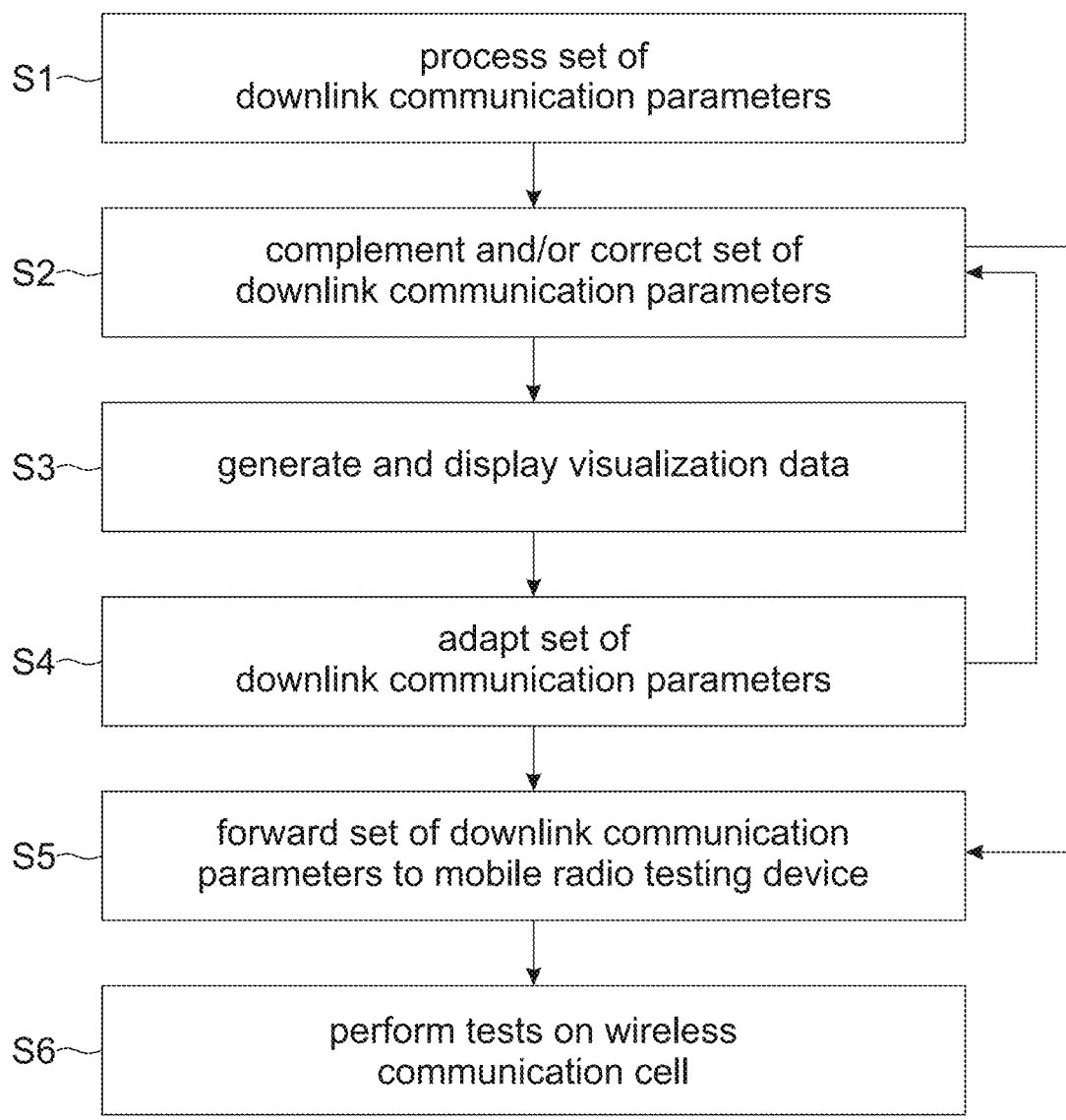
FIG. 3 shows an example of a flow chart of a visualization and/or testing method according to the present disclosure.

In some embodiments, the measurement instrument 16 is configured to perform a visualization method of visualizing downlink signal power levels and offsets in the wireless communication cell 10 and/or a testing method of testing the wireless communication cell 10, which are described in the following with reference to FIG. 3.

A set of downlink communication parameters is processed by the processing circuit 18 (step S1). Therein and in the following, the term "downlink communication parameters" is understood to denote one or more of the following quantities: a maximum energy per resource element (EPRE-max), a signal synchronization block (SSB), a channel state indicator reference signal (CSI-RS), a secondary synchronization signal (SSS) EPRE, a primary synchronization signal (PSS), a physical downlink control channel (PDCCH), a physical downlink shared channel (PDSCH), and/or a non-zero-power(NZP) CSI-RS.

In some embodiments, the user may input the downlink communication parameters, for example the complete set of downlink communication parameter, by the graphical user interface 26.

As is illustrated in FIG. 2, the graphical user interface 26 may comprise a graphical editor 28, wherein the user may adapt the downlink communication parameters by moving boxes 30 depicting the downlink communication parameters (illustrated exemplarily for the case of SSS and PDCCH in FIG. 2). Hence, a drag and drop interface is established by the graphical editor 28.

Alternatively or additionally, the graphical user interface 26 may comprise a dropdown menu that allows a user to choose the downlink communication parameters from a list, for example wherein the list comprises only valid choices for the downlink communication parameters.

Alternatively or additionally, the graphical user interface 26 may comprise numerical text fields, wherein the user may enter the downlink communication parameters into the numerical text fields.

Alternatively or additionally, the downlink communication parameters may be loaded from a database saved in the memory 22, for example wherein the complete set of downlink communication parameter may be loaded from the memory 22. Accordingly, at least some of the downlink communication parameters may be set to a default value saved in the database.

The user may adapt the default values by the graphical user interface 26, for example the graphical editor 28.

The set of downlink communication parameters entered by the user may automatically be complemented with at least one missing downlink communication parameter by the processing circuit 18. Alternatively or additionally, the set of downlink communication parameters input by the user is corrected automatically by the processing circuit 18 (step S2).

The resulting downlink signal power levels and offsets of a portion of the wireless communication cell 10 or of the whole wireless communication cell are visualized by the visualization circuit 24 (step S3).

In some embodiments, visualization data is generated by the visualization circuit 24 based on the set of downlink communication parameters, wherein the visualization data is displayed on the display 20. In some embodiments, the visualization data comprises information on a status of the wireless communication cell 10, wherein the status relates to the validity of downlink signal power levels and offsets in the wireless communication cell 10.

As is illustrated in FIG. 2, the visualization data may comprise absolute reference points and/or relative reference points, e.g. EPREmax, a SSB, a CSI-RS, and/or a SSS EPRE.

Other downlink signal power levels and/or offsets may be visualized relative to the absolute reference points and/or relative reference points, e.g. a PSS, a PDCCH, a PDSCH, and/or an NZP CSI-RS.

The user may select individual portions of the wireless communication cell 10, e.g. individual user devices 12, individual channels, and/or individual beams, by the graphical user interface 26. For example, the user may select individual portions by pressing a corresponding button 32.

In the example shown in FIG. 2, the user has selected SSB #1 (i.e. the user "follows" SSB #1), such that a box 34 corresponding to SSB #1 is expanded. In the expanded box 34, all downlink communication parameters that are relevant to SSB #1 are displayed. The view shown in FIG. 2 relies on a context centric representation of SSB beams and their refinement resources (NZP CSI-RS), wherein the active context is that followed by the PDCCH and PDSCH.

The downlink communication parameters associated with the selected portion of the wireless communication cell 10 are adaptable, i.e. can be changed by the user. In the example shown in FIG. 2, the user may adapt the downlink communication parameters associated with SSB #1.

Likewise, the user may unselect individual portions of the wireless communication cell 10, e.g. individual user devices 12, individual channels, and/or individual beams, by the graphical user interface 26. In the example shown in FIG. 2, the user has unselected SSB #2 to SSB #n (i.e. the user "unfollows" SSB #2 to SSB #n), such that boxes 36 corresponding to SSB #2 to SSB #n are collapsed.

Certain downlink communication parameters may be displayed in the collapsed boxes 36. For example, the collapsed boxes 36 may display content of the SSB and/or NZP CSI-RS, e.g. in the form of text boxes 38. As another example, a possible level with respect to unfollowed beams may be displayed. The content in the collapsed boxes 36 may be displayed in read-only mode, i.e. the user may be unable to adapt downlink communication parameters associated with the unselected portions of the wireless communication cell 10.

The user may adapt the set of downlink communication parameters by the graphical user interface 26, thereby obtaining an adapted set of downlink communication parameters (step S4).

Therein, at least one of the remaining downlink signal parameters may be automatically adapted if at least one downlink signal parameter is adapted via the graphical user interface 26. In some embodiments, interdependencies of the downlink communication parameters may be taken into account automatically. If the user adapts at least one of the downlink communication parameters, the downlink communication parameters that are dependent on the at least one adapted downlink communication parameters are automatically adapted, thereby obtaining the adapted set of downlink communication parameters.

In some embodiments, the at least one of the remaining downlink signal parameters is automatically adapted such that a resulting configuration of the wireless communication cell 10 is viable.

In some embodiments, a hierarchy may be provided between the downlink signal parameters, wherein downlink signal parameters belonging to a lower level of the hierarchy are automatically adapted. The hierarchy may reflect interdependencies between the downlink communication parameters, such that dependent downlink communication parameters are on a lower hierarchy level than the respective downlink communication parameters they depend on. Thus, downlink communication parameters on a lower level of the hierarchy may be automatically adapted.

Steps S2 and S3 described above may be repeated for the adapted set of communication parameters, i.e. the adapted set of downlink communication parameters may be complemented and/or corrected, and the resulting set of downlink communication parameters may be visualized on the display 20.

The initially generated set of downlink communication parameters and/or the adapted set of downlink communication parameters may be forwarded to the mobile radio testing device described above (step S5).

Accordingly, the 5G New Radio base station 14 of FIG. 1 may be established by the mobile radio testing device, e.g. a base station emulator or a base station simulator.

The wireless communication cell 10, for example the user device(s) 12, is tested by the mobile radio testing device based on the received set of downlink communication parameters (step S6).

Accordingly, the configuration of the wireless communication cell 10 corresponding to the received set of downlink communication parameters can be verified by testing the wireless communication cell 10. For example, beam selection tests and/or throughput tests may be performed by the mobile radio testing device. However, it is to be understood that any other suitable tests may be performed on the wireless communication cell 10, e.g. according to a test protocol that is provided in the communication standard used by the wireless communication cell 10, e.g. in the 5G New Radio standard.

Using the method(s) described above, the user can adapt the downlink communication parameters, and the wireless communication cell 10 can immediately be tested based on the adapted communication parameters.

FIGS. 4 to 14 schematically show different use cases of the visualization and/or testing method described above.

Figure 4:
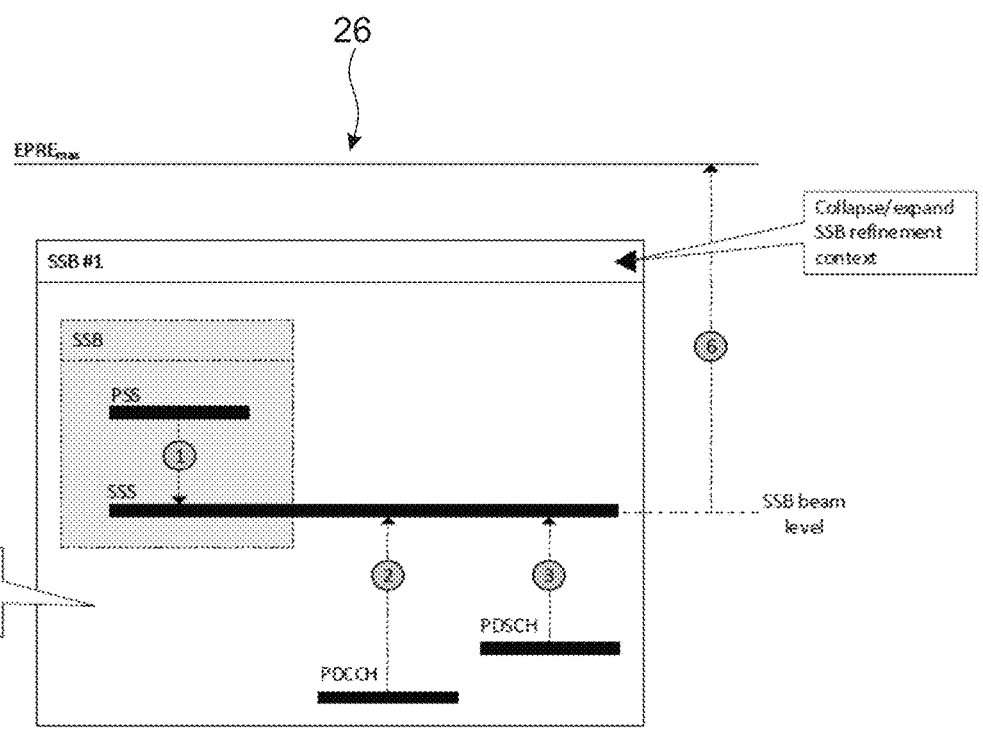
FIGS. 4 to 14 schematically show examples of different use cases of the visualization and/or testing methods.

FIG. 4 illustrates the configuration of a single SSB beam without attenuation.

Figure 5:
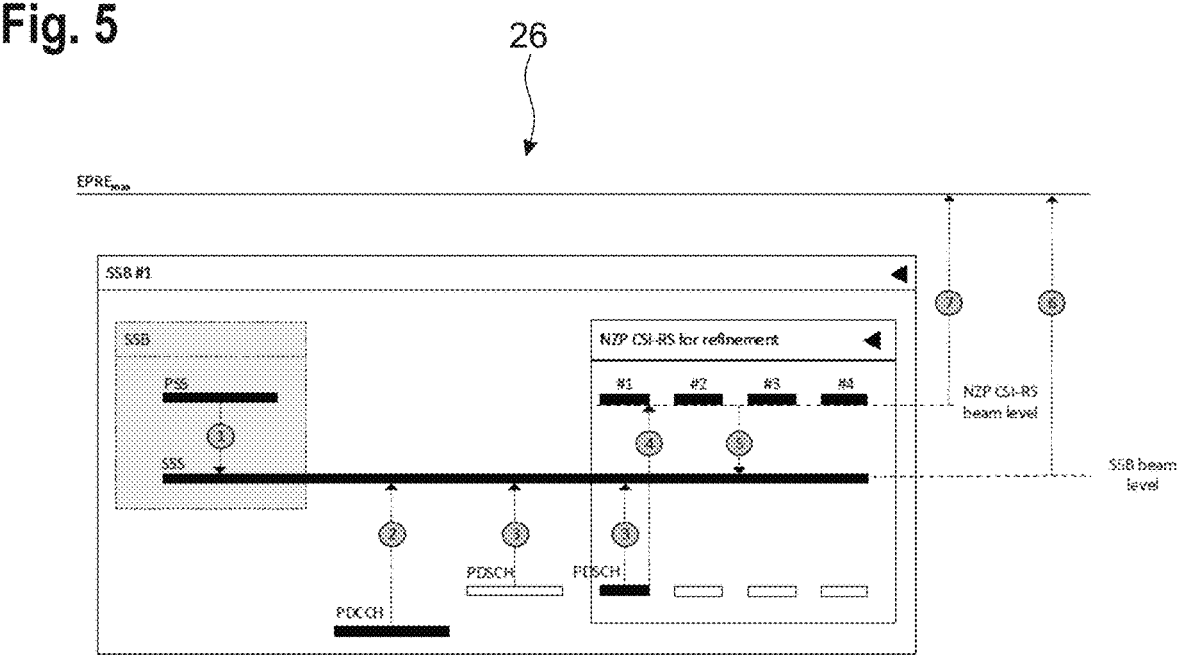

FIG. 5 illustrates the configuration of a single SSB beam with NZP CSI-RS refinement beams without attenuation. In some embodiments, four NZP CSI-RS resources (#1, #2, #3, #4) are provided for the SSB #1 beam refinement. No attenuation is applied to any of the NZP CSI-RS resources. The PDSCH switches to following one of the NZP CSI RS refinement resources, e.g. #1, depending on the scenario configuration, e.g. CSI reporting.

Figure 6:
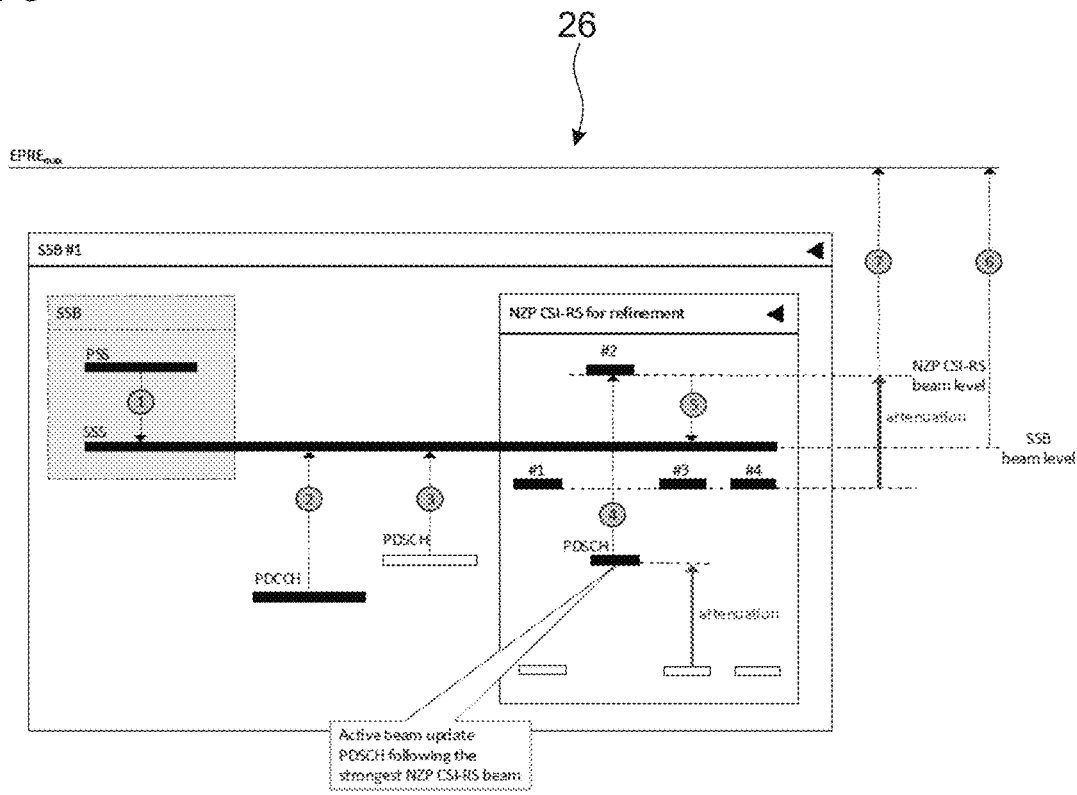

FIG. 6 illustrates the configuration of a single SSB beam with NZP CSI-RS refinement beams with attenuation. NZP CSI-RS resources #1, #3, and #4 experience attenuation. Thus, NZP CSI-RS #2 becomes the strongest beam, and thus may be preferred by the user device 12. The PDSCH switches to following the NZP CSI-RS #2 beam. The actual PDSCH transmission level is indicated by the black box. White boxes mean "no transmission", i.e. they indicate a possible level if the respective beam were followed.

Figure 7:
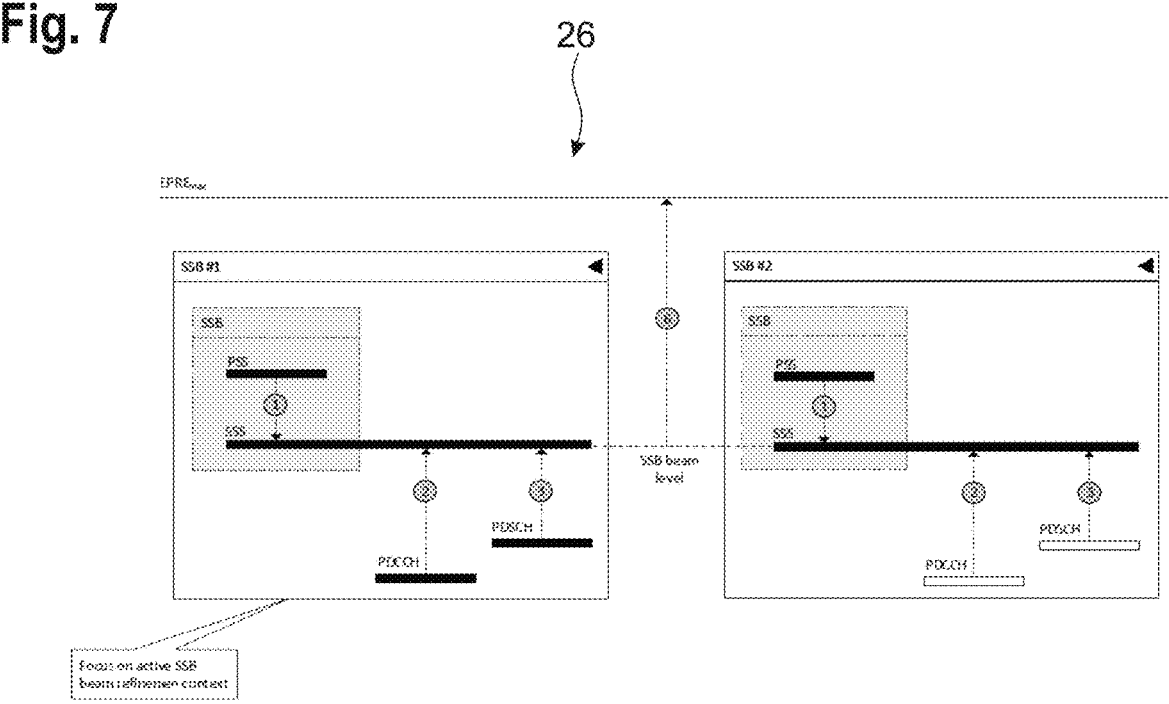

FIG. 7 illustrates the configuration of a two SSB beams without attenuation. SSB #2 beam is displayed with an own refinement context. No attenuation is applied to any of the SSB beams. The display focuses on the active SSB refinement context, i.e. where the PDSCH follows the SSB beam, here SSB #1. The SSB #2 refinement context is displayed indicating the actual PSS/SSS levels. PDCCH/PDSCH are displayed in white boxes hinting to a possible level if PDCCH/PDSCH were following the SSB #2 beam. Channels in white boxes mean "no actual transmission".

Figure 8:
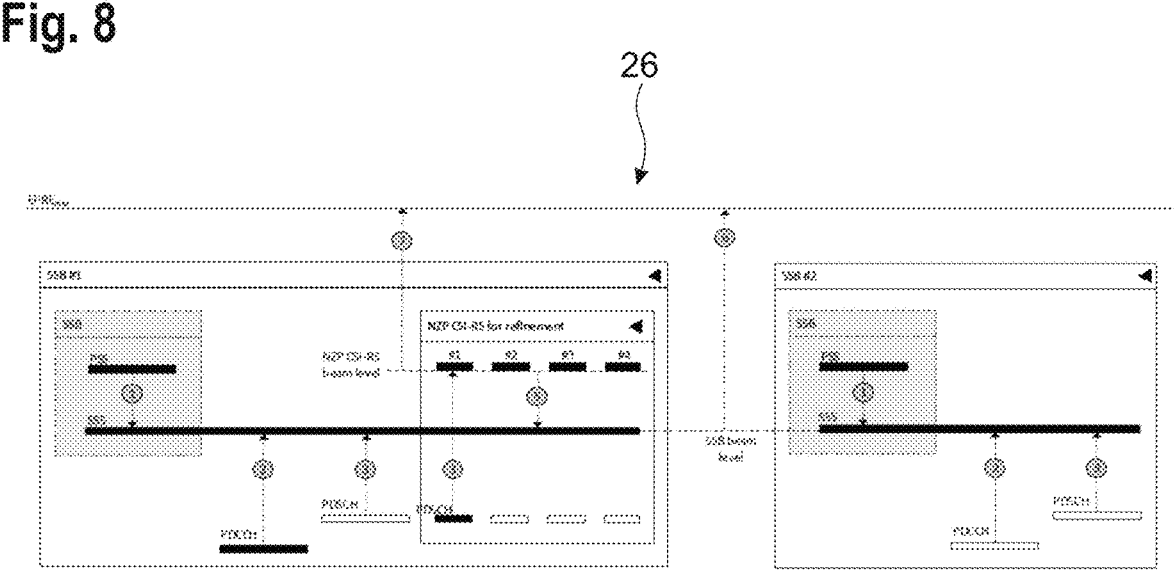

FIG. 8 illustrates the configuration of a two SSB beams with NZP CSI-RS refinement beams for SSB #1 without attenuation. NZP CSI-RS refinement resources are set up for SSB #1, and are thus displayed in the SSB #1 refinement context. No attenuation is applied to any of the NZP CSI-RS beams.

Figure 9:
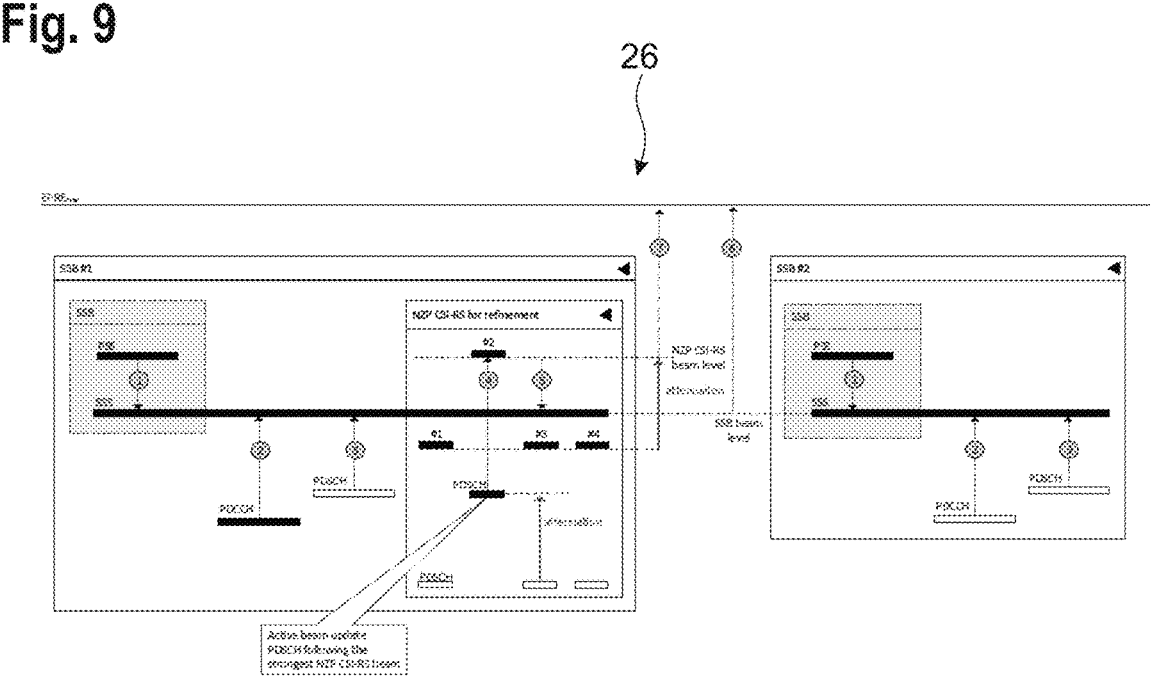

FIG. 9 illustrates the configuration of two SSB beams without attenuation plus NZP CSI-RS refinement beams with attenuation. NZP CSI-RS refinement resources are set up for SSB #1, and are thus displayed in the SSB #1 refinement context. Attenuation is applied to NZP CSI-RS refinement resources #1, #3, #4. NZP CSI-RS resource #2 is the strongest beam, and may hence be preferred by the user device 12. PDSCH beam follows the strongest NZP CSI-RS beam #2.

Figure 10:
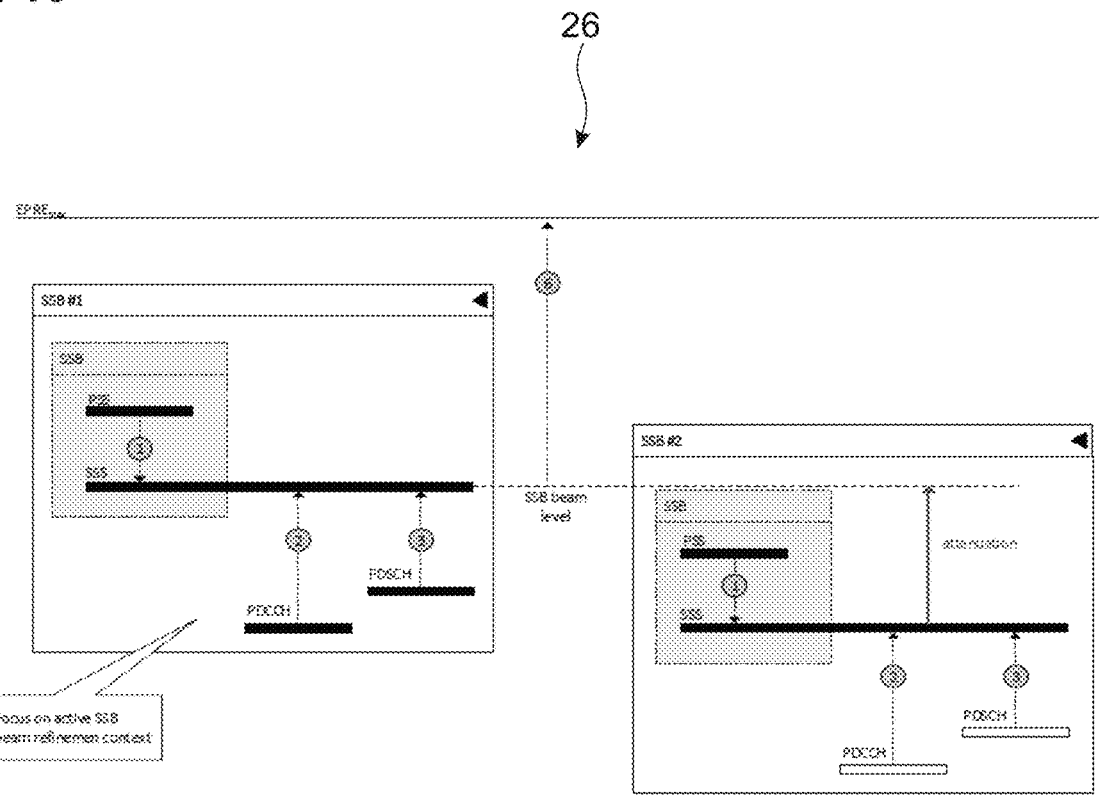

FIG. 10 illustrates the configuration of a two SSB beams, wherein attenuation is applied to SSB #2. PDCCH/PDSCH beams follow the SSB #1 beam as displayed by the black box within the refinement context of SSB #1. The white boxes in the SSB #2 refinement context indicate possible levels for PDCCH/PDSCH if the SSB #2 beam were followed, but there is no actual transmission.

Figure 11:
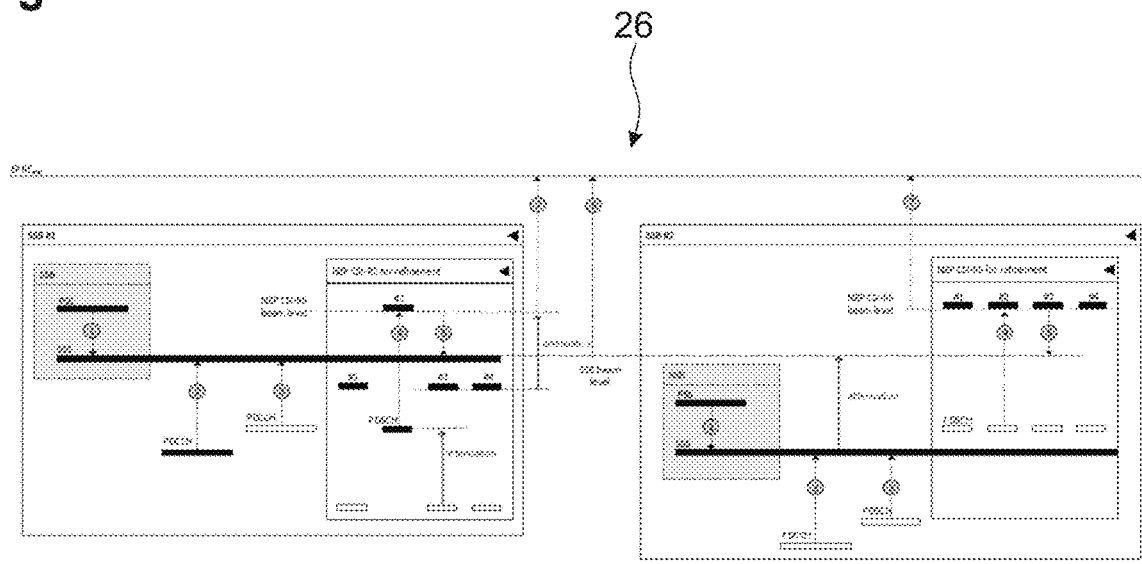

FIG. 11 illustrates the configuration of two SSB beams plus NZP CSI-RS for refinement (expanded). Attenuation is applied to the SSB #2 beam. NZP CSI-RS resources are added for SSB #2 beam refinement, and are hence displayed in the SSB #2 refinement context. PDCCH/PDSCH beams follow the NZP CSI-RS #2 beam in the SSB #1 refinement context. Possible PDCCH/PDSCH levels in the SSB #2 refinement context are illustrated by the white boxes.

Figure 12:
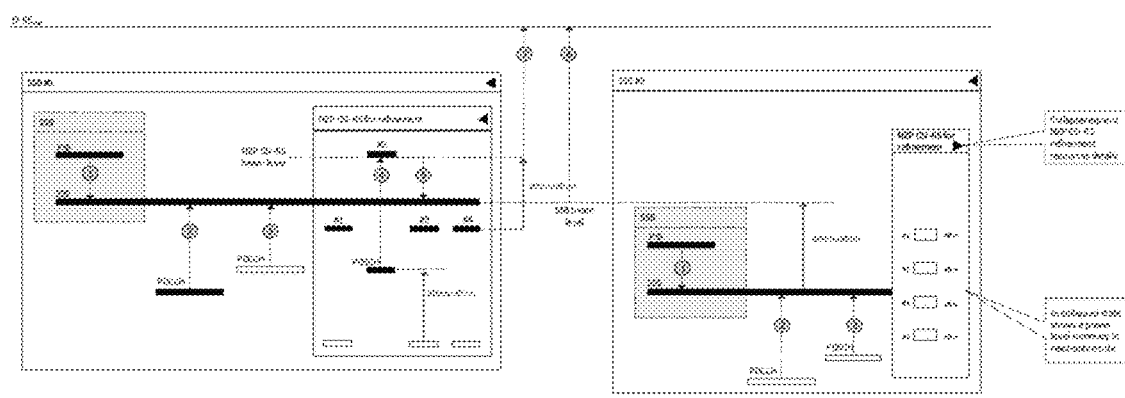

FIG. 12 illustrates the configuration of two SSB beams plus NZP CSI-RS for refinement (collapsed on inactive SSB beam #2). This corresponds to the scenario described above with reference to FIG. 11, but details of the NZP CSI-RS resources for the SSB #2 beam refinement are collapsed in order to save display space. The "NZP CSI-RS for refinement" box shows a summary of the power level of all comprised NZP CSI-RS resources in read only mode. The user can press on the arrow pointing to the right in the upper right corner of the box in order to expand details and enter an edit mode.

Figure 13:
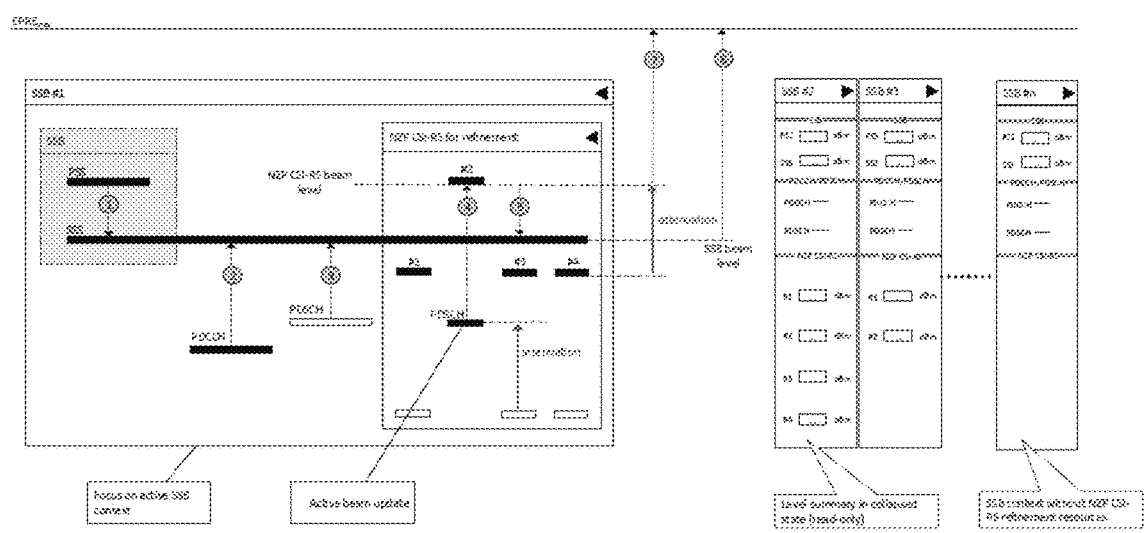

FIG. 13 illustrates the configuration of multiple SSB beams (active SSB beam context expanded, rest collapsed). This corresponds to the scenario also illustrated in FIG. 2. There are n (n being a natural number) SSB refinement contexts, but only the active context is automatically expanded (SSB #1). The "active" context means that the PDSCH is either following the SSB or one of the NZP CSI-RS refinement beams. The remaining refinement contexts associated with SSB #2 to SSB #n are collapsed in order to save display space. In the collapsed state, the context shows a power level summary of the PSS/SSSs (always present) as well as a power level summary of configured NZP CSI-RS resources (if present). In the example shown in FIG. 13, SSB #2 has four NZP CSI-RS refinement resources, SSB #3 has two NZP CSI-RS refinement resources, and SSB #n has no NZP CSI-RS refinement resources. In the collapsed state, the PDCCH/PDSCH levels are only indicated for the active SSB refinement context in which those channels are actually transmitted. For all others they are indicated as "unavailable" (i.e. by a horizontal line).

Figure 14:
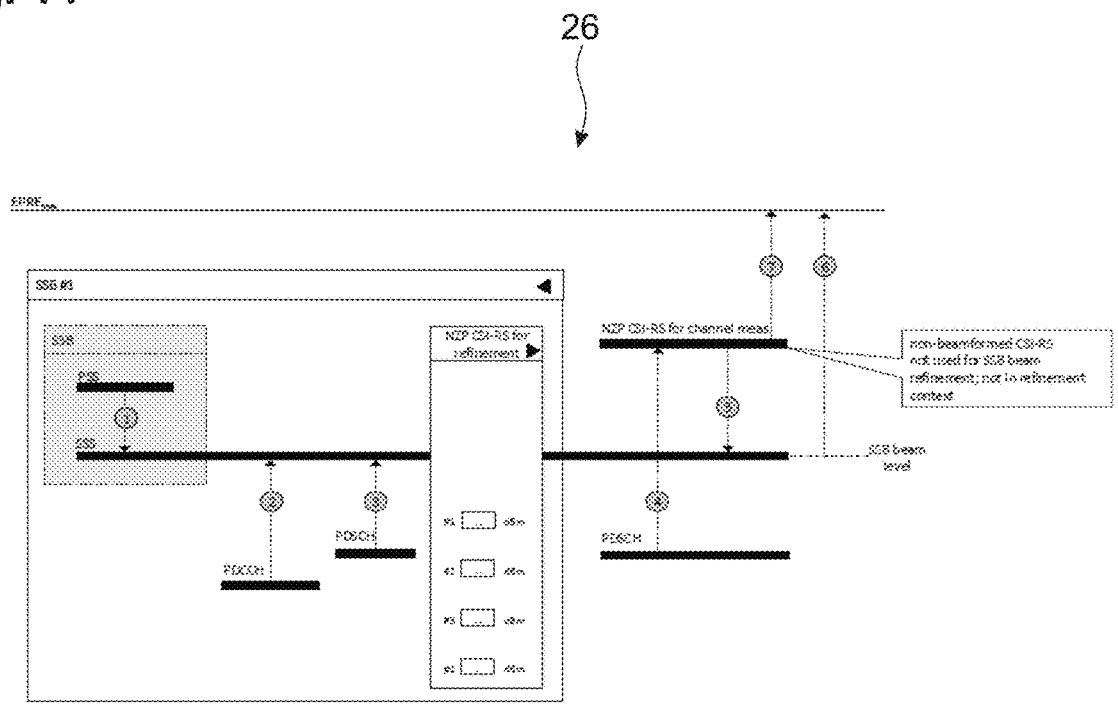

FIG. 14 illustrates the configuration of SSB refinement using NZP CSI-RS resources plus NZP CSI-RS for channel measurements. SSB #1 has a refinement context using NZP CSI-RS resources. Details of the NZP CSI-RS beam refinement resources are collapsed in order to save display space. Users can expand those by clicking on the arrow pointing to the right in the upper right corner of the NZP CSI-RS refinement resources box. There is also one non beamformed NZP CSI-RS resource for channel measurements (CQI/PMI/RI), which is displayed outside of the SSB refinement context.

Certain embodiments disclosed herein include components, such as for example the measurement instrument 16, that the utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implemented the functionality described herein.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

It should now be appreciated that some embodiments of the present disclosure, or portions thereof, have been described in the general context of computer code or machine-useable instructions, including computer-executable instructions such as program modules, etc., being executed by a computing system, or other machine or machines. Some of these embodiments or others may be implemented using a variety of system configurations, including handheld devices, consumer electronics, general-purpose computers, more specialty computing devices, etc. Embodiments described herein may also be implemented in distributed computing environments, using remote-processing devices that are linked through a communications network or the Internet.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A visualization method of visualizing downlink signal power levels and offsets in a wireless communication cell, the visualization method comprising the steps of:
   processing, by a processing circuit, a set of downlink communication parameters, wherein the set of downlink communication parameters comprises downlink signal parameters of the wireless communication cell, wherein the downlink signal parameters relate to the wireless communication cell as a whole or to portions of the wireless communication cell; and
   generating, by a visualization circuit, visualization data based on the set of downlink communication parameters, wherein the visualization data comprises information on a status of the wireless communication cell, and wherein the status relates to the validity of downlink signal power levels and offsets in the wireless communication cell, wherein the information on the status relating to the validity comprises at least one visual indicator that indicates whether the downlink signal power levels and offsets are compatible with each other or incompatible with each other.

2. The visualization method of claim 1, wherein the visualization data comprises at least one absolute reference point and/or at least one relative reference point.

3. The visualization method of claim 2, wherein the visualization data comprises a maximum energy per resource element (EPREmax), a signal synchronization block (SSB), and/or a channel state indicator reference signal (CSI-RS).

4. The visualization method of claim 1, wherein the visualization data comprises a secondary synchronization signal (SSS) energy per resource element (EPRE) as a reference signal.

5. The visualization method of claim 4, wherein the visualization data comprises a primary synchronization signal (PSS), a physical downlink control channel (PDCCH), a physical downlink shared channel (PDSCH), and/or a non-zero-power (NZP) CSI-RS in relation to the SSS EPRE.

6. The visualization method of claim 1, wherein the visualization data comprises a PDSCH in relation to a NZP CSI-RS.

7. The visualization method of claim 1, wherein the set of downlink communication parameters is provided with default values of the downlink signal parameters.

8. The visualization method of claim 1, wherein a user interface is provided, wherein the set of downlink communication parameters is adaptable via the user interface.

9. The visualization method of claim 8, wherein at least one of the remaining downlink signal parameters is automatically adapted if at least one downlink signal parameter is adapted via the user interface, thereby obtaining an adapted set of downlink communication parameters.

10. The visualization method of claim 9, wherein the at least one of the remaining downlink signal parameters is automatically adapted such that a resulting configuration of the wireless communication cell is viable.

11. The visualization method of claim 9, wherein a hierarchy is provided between the downlink signal parameters, and wherein downlink signal parameters belonging to a lower level of the hierarchy are automatically adapted.

12. The visualization method of claim 9, wherein adapted visualization data is generated based on the adapted set of downlink communication parameters.

13. The visualization method of claim 8, wherein individual portions of the wireless communication cell are selectable via the user interface.

14. The visualization method of claim 13, wherein the visualization data comprises a PDSCH as a global offset to a predefined reference, wherein an actual PDSCH is displayed in the context of a selected portion of the wireless communication cell.

15. The visualization method of claim 14, wherein the predefined reference is an SSB or a NZP CSI-RS beam.

16. The visualization method of claim 1, wherein the wireless communication cell is a 5G New Radio cell.

17. A measurement instrument, the measurement instrument comprising a visualization device being configured to perform the visualization method of claim 1.

18. A testing method of testing a wireless communication cell, the testing method comprising the steps of:
   processing, by a processing circuit, a set of downlink communication parameters, wherein the set of downlink communication parameters comprises downlink signal parameters of the wireless communication cell, wherein the downlink signal parameters relate to the wireless communication cell as a whole or to portions of the wireless communication cell; and generating, by a visualization circuit, visualization data based on the set of downlink communication parameters, wherein the visualization data comprises information on a status of the wireless communication cell, wherein the status relates to the validity of downlink signal power levels and offsets in the wireless communication cell, wherein the information on the status relating to the validity comprises at least one visual indicator that indicates whether the downlink signal power levels and offsets are compatible with each other or incompatible with each other;

wherein a user interface is provided, wherein the set of downlink communication parameters is adaptable via the user interface, and wherein the set of downlink communication parameters is forwarded to a mobile radio testing device.

19. The testing method of claim 18, wherein a beam selection test and/or a throughput test is performed by the mobile radio testing device.

20. The testing method of claim 18, wherein at least one of the remaining downlink signal parameters is automatically adapted if at least one downlink signal parameter is adapted via the user interface, thereby obtaining an adapted set of downlink communication parameters, wherein the adapted set of downlink communication parameters is forwarded to the mobile radio testing device.

* * * * *